(12) United States Patent
Menheere

(10) Patent No.: US 10,989,203 B2
(45) Date of Patent: Apr. 27, 2021

(54) CENTRIFUGAL COMPRESSOR AND SHROUD THEREFORE

(71) Applicant: PRATT & WHITNEY CANADA CORP., Longueuil (CA)

(72) Inventor: Dave Menheere, Norval (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 113 days.

(21) Appl. No.: 16/511,188

(22) Filed: Jul. 15, 2019

(65) Prior Publication Data

US 2021/0018006 A1 Jan. 21, 2021

(51) Int. Cl.
*F04D 25/04* (2006.01)

(52) U.S. Cl.
CPC .......... *F04D 25/04* (2013.01); *F05D 2220/32* (2013.01); *F05D 2300/171* (2013.01); *F05D 2300/1721* (2013.01)

(58) Field of Classification Search
CPC ............... Y02T 10/144; F05D 2220/40; F05D 2300/171; F05D 2300/1721; B60Y 2400/435; F04D 25/04

See application file for complete search history.

(56) References Cited

U.S. PATENT DOCUMENTS

| | | | | |
|---|---|---|---|---|
| 3,844,011 A * | 10/1974 | Davies | .................. | B29C 43/006 428/547 |
| 10,309,410 B2 * | 6/2019 | Ottow | .................... | F04D 29/284 |
| 2009/0000101 A1 * | 1/2009 | Reynolds | ................ | B23P 6/007 29/402.11 |
| 2015/0354407 A1 * | 12/2015 | Anglin | ...................... | F16N 7/00 188/82.77 |
| 2018/0135525 A1 * | 5/2018 | Morgan | ................. | F04D 27/023 |
| 2018/0283394 A1 * | 10/2018 | Miyoshi | .................. | F04D 29/62 |

FOREIGN PATENT DOCUMENTS

FR 2947016 12/2010
GB 1528421 9/1976

OTHER PUBLICATIONS https://www.hightempmetals.com/techdata/hitemp418data.php; Copyright 2015; High Temp Metals (Year: 2015).*

* cited by examiner

*Primary Examiner* — Jesse S Bogue
(74) *Attorney, Agent, or Firm* — Norton Rose Fulbright Canada LLP

(57) ABSTRACT

The shroud can have a wall curved radially outwardly from an axially oriented inlet to an outlet end, a structural member having a flange at the outlet end, and an insert of Greek Ascoloy exposed on an inner face of the wall.

20 Claims, 2 Drawing Sheets

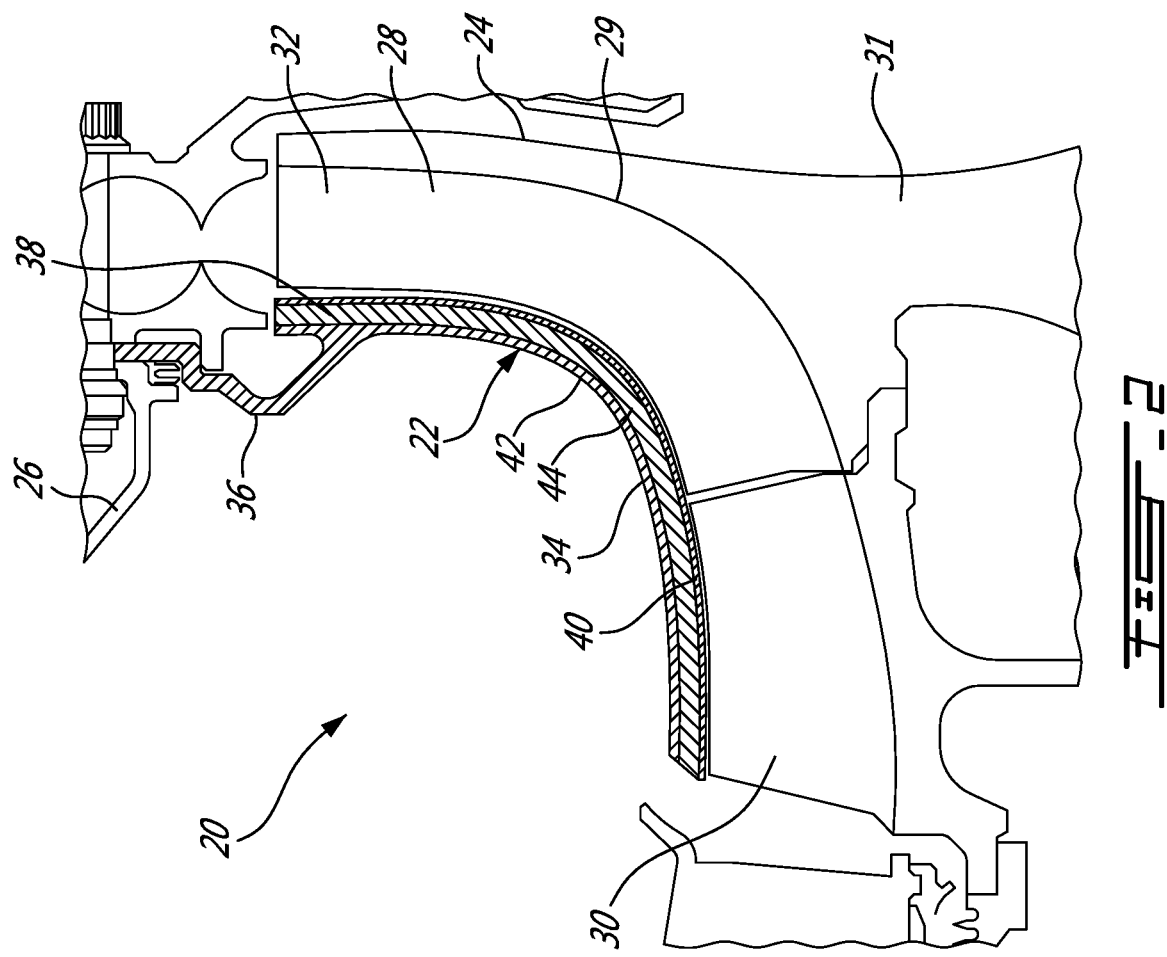

CENTRIFUGAL COMPRESSOR AND SHROUD THEREFORE

TECHNICAL FIELD

The application related generally to gas turbine engines and, more particularly, to centrifugal compressors thereof.

BACKGROUND OF THE ART

Centrifugal compressors are used in various models and types of gas turbine engines. Centrifugal compressors typically have an axial inlet and a radially outwardly curving shape leading from the axial inlet to a radially-oriented outlet. The compressor rotor is housed in a shroud, and one concern in centrifugal compressor design is to minimize the gap, commonly referred to as tip clearance, between the compressor blades and the shroud, to increase efficiency. Although known centrifugal compressors were satisfactory to a certain extent, there always remains room for improvement.

SUMMARY

In one aspect, there is provided a shroud for a centrifugal compressor having a rotation axis, the shroud having a wall curved radially outwardly from an axially oriented inlet to an outlet end, a structural member having a flange at the outlet end, and an insert of Greek Ascoloy exposed on an inner face of the wall.

In another aspect, there is provided a gas turbine engine having, in serial flow communication, a compressor section, a combustor, and a turbine section, the compressor section having a centrifugal compressor, the centrifugal compressor having a rotor rotatably mounted within an engine casing for rotation around a rotation axis, and a shroud having a wall curved radially outwardly from an axially oriented inlet to an outlet end, a structural member having a radially-oriented flange at the outlet end, the flange connecting the shroud to the engine casing, and an exposed layer of Greek Ascoloy facing the rotor.

In a further aspect, there is provided method of operating a gas turbine engine including: compressing air along a gas flow path including rotating a rotor of a centrifugal compressor inside a shroud, the shroud having an exposed layer of Greek Ascoloy facing the rotor, and a structural member.

DESCRIPTION OF THE DRAWINGS

Reference is now made to the accompanying figures in which:

FIG. 2 is a cross-sectional view, fragmented, of a centrifugal compressor in accordance with an embodiment.

DETAILED DESCRIPTION

Figure 1:
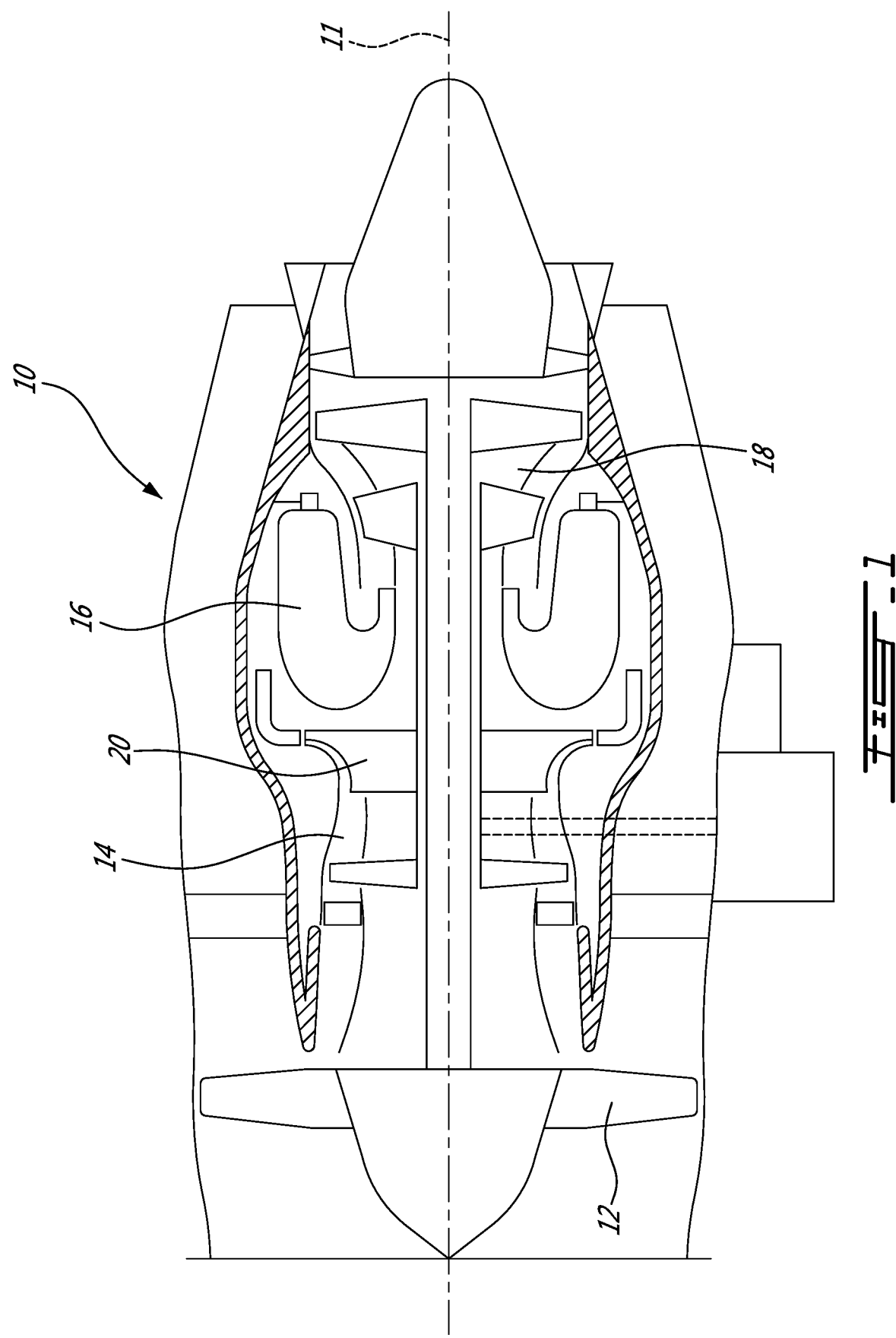
FIG. 1 is a schematic cross-sectional view of a gas turbine engine.

FIG. 1 illustrated a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The gas turbine engine depicted in FIG. 1 is one example of a gas turbine engine which has a centrifugal compressor 20. More specifically, the centrifugal compressor 20 is provided here immediately upstream of the combustor 16, as a final stage of high pressure compression.

In some modern gas turbine engines, higher and higher pressure ratios are sought, which increases the temperature at which centrifugal compressors are exposed, and poses certain design challenges which are added to the usual challenges of achieving small tip clearances. Moreover, in rare occurrences, the relative movement between the shroud and the centrifugal compressor blades can exceed the typical relative movements which can be expected between the two. Designing the shroud in a manner to accommodate such uncommon movement amplitudes results in greater tip clearance during most of the engine operating envelope. Accordingly, it can be desired to design the shroud in a manner to constantly clear the blade tips during the common movement amplitudes and to resist contact with the blade tips, a phenomenon referred to as "rubbing", when uncommon movement amplitudes occur.

Different materials react differently to rubbing, and there are a limited set of materials which are available to sustain the higher ranges of temperatures and pressures. Inconel, a family of nickel alloys, can include interesting materials for this context, but if the blades rub against an Inconel surface, the Inconel surface can significantly abrade tips of the blades, and the tip clearance can significantly increase as a result, defeating the purpose of designing the shroud with a small tip clearance. Greek Ascoloy, alternately referred to as 418 steel, has better rub tolerance than Inconel. Indeed, when blades rub against Greek Ascoloy, the blades can have less of a tendency to abrade, which can help maintaining tip clearance. However, Greek Ascoloy reacts differently to high temperatures, and if temperatures are in the higher ranges, such as in the order of 700 to 1200 degrees F. at the outlet of the centrifugal compressor, the heat can transfer to the flange which holds the radially outer portion of the shroud to the casing, and Greek Ascoloy can deform in these circumstances, leading to an increased tip clearance, again defeating the purpose of the initial design.

FIG. 2 illustrates an embodiment of a centrifugal compressor having an engineered shroud 22 designed to accommodate high outlet pressure/temperature ranges. The centrifugal compressor has a rotor 24 rotatably housed in the engine casing 26. The rotor 24 generally has a solid-of revolution shape with a plurality of circumferentially interspaced blades 28 protruding from a wall 29 of a body 31. The centrifugal compressor 20 has an inlet 30 where a stream of air is received, and an outlet 32 where the compressed air is discharged. The shroud 22 has a wall 34 which encloses, in collaboration with the wall 29 of the rotor 24, a segment of the core gas path in which the blades 28 extend. A flange 36 can protrude radially outwardly from an outlet end 38 of the wall 34, for connecting the shroud 22 to the casing 26. The connection can be completely fixed, such as by bolting, or have a certain degree of freedom.

In this embodiment, the shroud 22 has at least two components: an insert 40 made of Greek Ascoloy, exposed and forming an inner face of the wall 34, adjacent the blade tips, and a structural member 42 including the flange 36, holding the insert 40 relative to the casing 26. The structural member 42 can be made of a different material, specifically selected in a manner to maintain its mechanical resistance properties at high temperature, e.g. 700, 900, 1100 degree F., and continue to maintain the tip clearance under such conditions, while not necessarily being best suited for rubbing. To this end, the structural member can be made of an Inconel, such as Inconel 625, 718, or 410, for instance, or of steel, such as 321 or 327 steel for instance. Accordingly, in the event of a rub, the blade 28 tips can come into contact with a layer of Greek Ascoloy rather than coming into direct contact with the material of the structural member 42. The Greek Ascoloy insert 40 can entirely cover the inner face of the shroud wall 34, or only cover a portion of the inner face of the shroud wall 34 which has previously been identified as being prone to rubbing, for instance.

In this embodiment, the structural member 42 has a layer extending along an entire outer face of the wall 34, and a core 44 is sandwiched between the structural member 42 layer and the Greek Ascoloy 40 layer. In an alternate embodiment, the structural member can extend only along a portion of the wall of the shroud, or be secured to a wall of the shroud, for instance, and the Greek Ascoloy insert can be secured directly to the structural member rather than via a third component. In the illustrated embodiment, the core 44 can be a honeycomb for instance. Indeed, in the example embodiment illustrated, the core 44 is made of a steel honeycomb material, which can be brazed to both the Greek Ascoloy 40 layer and to the structural member 42 layer, for instance.

Using a honeycomb core 44 between two layers 40, 42 can provide increased stiffness, and extra thickness, at a limited tradeoff of weight and cost. In particular, the shroud 22 can be configured in a manner that in the event of a rough rub where the blades pierce the layer of Greek Ascoloy 40, "venting" the shroud and exposing open ends of the honeycomb cells (the cells being oriented in a manner to extend between the two layers), the outer layer 40 can seal the opposite end of the honeycomb cells in a manner to contain the increase in pressure in the honeycomb cells and for the compressor 20 to continue operating substantially unhindered.

Another potential advantage of using a honeycomb core 44 is that it can provide a certain degree of thermal insulation, between the Greek Ascoloy insert 40 and the structural member 42. This can be desired if, for instance, the structural member 42 has a higher coefficient of thermal expansion, and if the thermal expansion of the structural member 42 is considered undesirable in the context of a specific embodiment. In such cases, the use of a honeycomb core 44, or another intermediate material, can, to a certain extent, thermally decouple the Greek Ascoloy insert 40 from the structural member 42 and impede thermal expansion of the structural member 42. Alternately, if thermal expansion of the structural member is considered desirable in the context of a specific embodiment, the shroud can be designed in a manner to favour thermal conduction between the Greek Ascoloy insert and the structural member.

The above description is meant to be exemplary only, and one skilled in the art will recognize that changes may be made to the embodiments described without departing from the scope of the invention disclosed. For example, a shroud such as described above can be considered useful in other contexts, such as in other types of gas turbine engines, than turbofan engines. Still other modifications which fall within the scope of the present invention will be apparent to those skilled in the art, in light of a review of this disclosure, and such modifications are intended to fall within the appended claims.

The invention claimed is:

1. A shroud for a centrifugal compressor having a rotation axis, the shroud having a wall curved radially outwardly from an axially oriented inlet to an outlet end, a structural member having a flange at the outlet end, and an abradable insert of Greek Ascoloy exposed on an inner face of the wall.

2. The shroud of claim 1 wherein the wall further comprises a honeycomb core sandwiched between the insert of Greek Ascoloy and the structural member.

3. The shroud of claim 2 wherein the honeycomb core is made of steel.

4. The shroud of claim 2 wherein the honeycomb core is brazed to the insert of Greek Ascoloy.

5. The shroud of claim 1 wherein the insert of Greek Ascoloy forms a layer entirely covering the inner face of the wall.

6. The shroud of claim 1 wherein the structural member has a layer extending along an entire outer face of the wall.

7. The shroud of claim 6 wherein the flange protrudes from the layer of the structural member, and is integral thereto.

8. The shroud of claim 1 wherein the structural member is of Inconel.

9. A gas turbine engine having, in serial flow communication, a compressor section, a combustor, and a turbine section, the compressor section having a centrifugal compressor, the centrifugal compressor having a rotor rotatably mounted within an engine casing for rotation around a rotation axis, and a shroud having a wall curved radially outwardly from an axially oriented inlet to an outlet end, a structural member having a radially-oriented flange at the outlet end, the flange connecting the shroud to the engine casing, and an abradable exposed layer of Greek Ascoloy facing the rotor.

10. The gas turbine engine of claim 9 wherein the gas turbine engine is a turbofan engine, wherein the centrifugal compressor is provided downstream of an axial compressor in a core gas path.

11. The shroud of claim 10 wherein the wall further comprises a honeycomb core sandwiched between the insert of Greek Ascoloy and the structural member.

12. The shroud of claim 11 wherein the honeycomb core is made of steel.

13. The shroud of claim 11 wherein the honeycomb core is brazed to the insert of Greek Ascoloy.

14. The shroud of claim 9 wherein the insert of Greek Ascoloy forms a layer entirely covering the inner face of the wall.

15. The shroud of claim 9 wherein the structural member has a layer extending along an entire outer face of the wall.

16. The shroud of claim 15 wherein the flange protrudes from the layer of the structural member, and is integral thereto.

17. The shroud of claim 9 wherein the structural member is of Inconel.

18. A method of operating a gas turbine engine including:
compressing air along a gas flow path including rotating a rotor of a centrifugal compressor inside a shroud, the shroud having a wall curved radially outwardly from an axially oriented inlet to an outlet end and having an abradable exposed layer of Greek Ascoloy facing the rotor, and a structural member.

19. The method of claim 18 wherein said compressing air includes increasing a temperature of the air to above 900 degrees F., and increasing a temperature of a flange connecting an outlet end of the shroud to a casing of the gas turbine engine, the flange structurally resisting the increase in the temperature of the flange and maintaining the relative position between the Greed Ascoloy layer and blade tips of the rotor.

20. The method of claim 18 wherein the shroud further has a honeycomb core, wherein the structural member has a layer covering a face of the honeycomb core opposite to the layer of Greek Ascoloy, the method further comprising:

the rotating rotor rubbing against the layer of Greek Ascoloy, and creating an aperture therethrough, the aperture communicating with open first ends of cells of the honeycomb core;

the layer of the structural member sealing second ends of the cells and containing a pressure increase in the cells stemming from the creation of the aperture.

* * * * *